May 29, 1934.   M. J. WALL   1,961,117
METHOD OF WELDING COPPER ALLOYS, PARTICULARLY WROUGHT COPPER ALLOYS
Filed June 4, 1932   2 Sheets-Sheet 1
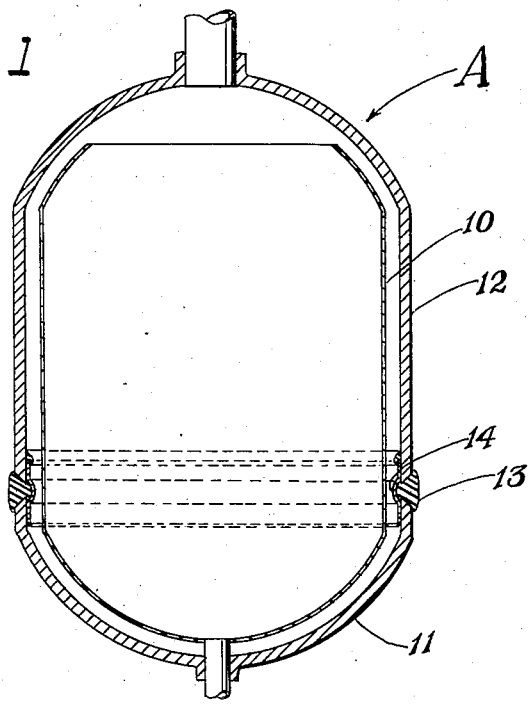
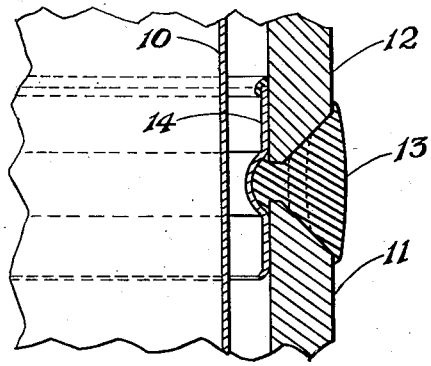
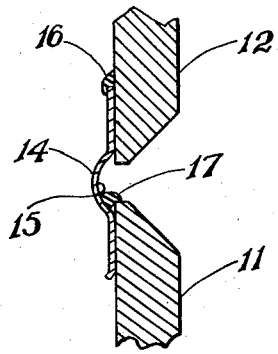
INVENTOR
Matthew J. Wall
BY
Watson, Bristol, Johnson & Leavenworth
ATTORNEYS May 29, 1934.  M. J. WALL  1,961,117
METHOD OF WELDING COPPER ALLOYS, PARTICULARLY WROUGHT COPPER ALLOYS
Filed June 4, 1932   2 Sheets-Sheet 2
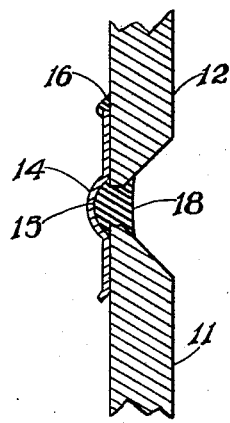
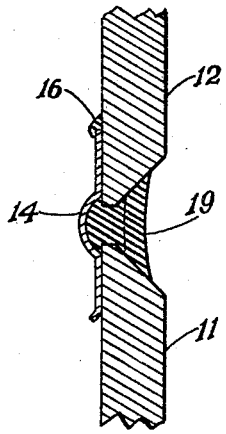
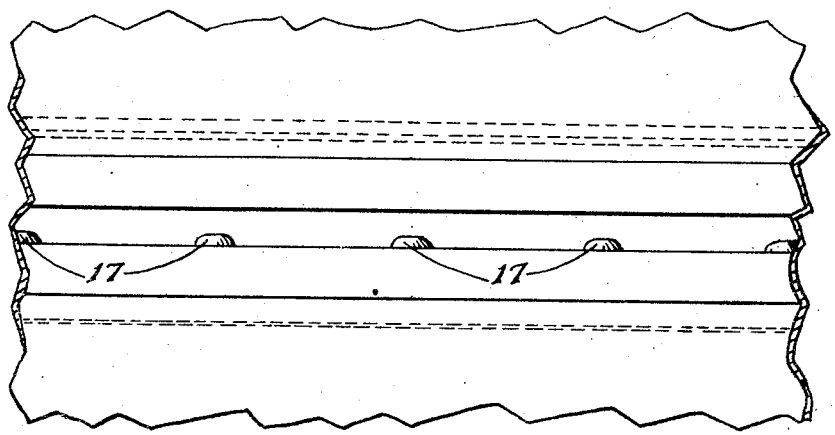
INVENTOR
Matthew J. Wall
BY
Watson, Bristol, Johnson & Leavenworth
ATTORNEYS Patented May 29, 1934

1,961,117

UNITED STATES PATENT OFFICE 1,961,117

METHOD OF WELDING COPPER ALLOYS, PARTICULARLY WROUGHT COPPER ALLOYS

Matthew J. Wall, Jersey City, N. J., assignor to The Linde Air Products Company, New York, N. Y.

Application June 4, 1932, Serial No. 615,312

13 Claims. (Cl. 113—112)

This invention relates to a method of welding copper alloys, particularly wrought copper alloys when of relatively heavy section. The invention has for its object generally to provide an expeditious and efficient method of welding metals of the character indicated in a manner that results in a joint having greatly improved physical properties.

More specifically, it is an object of the invention to provide a method of welding whereby relatively thick sections may be united by laying in welding metal in a plurality of steps, the steps being practiced so as to prevent undue spreading of heat, particularly in a backward direction, so as to avoid injury to adjacent metal walls.

Still another object is to provide a method of welding and fluxing by which weld-metal may be laid down relatively free from occluded gases, so that the resulting joint possesses relatively great mechanical strength.

Heretofore, when welding wrought copper alloy metals by a gas process, for example by the oxyacetylene process, a joint having generally satisfactory properties is obtainable only with comparatively thin sections of metal by the usual single layer deposit. As an illustration, when the sections to be welded exceeds one-half inch in thickness, the joint resulting from the single layer method is not entirely satisfactory, that is, the strength of the joint may be lower than that of the original base metal.

In the joining of comparatively thick sections of non-ferrous metal, for example in the fabrication of pressure containers from certain copper alloys and formed with a wall having a thickness greater than one-half inch, the method of the invention enables a sound joint to be quickly and expeditiously made, the weld-metal being deposited in the joint in two or more layers.

Where it was desired to construct a comparatively thick walled vessel having disposed therein a thin walled container, it was necessary either to join parts of the thick walled outer vessel by methods not involving the use of heat, for example, screw threading the parts or bolting together flanges connected to the parts, or by arranging the welded joint at a sufficient distance from the thin-walled inner vessel to avoid injury to same by the high temperatures involved in the welding operation.

With the method and means of the present invention, the welding of parts of a thick-walled body or vessel may be accomplished in close proximity to a thin-walled body or inner vessel by means of a liner, thereby avoiding substantially any injury to the inner vessel. The resulting joint will possess the physical properties desired. The present method particularly achieves relatively great economies in the design and fabrication of containers for liquefied gases of the type sometimes referred to as "pressure vessels" which have inner thin-walled linings in spaced relation to an outer thick-walled vessel for the holding, storing and transporting of liquefied gases.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the application of which will be indicated in the claims.

For a fuller understanding of the nature and objects of the invention, reference should be had to the following detailed description taken in connection with the accompanying drawings, in which:

Fig. 1 illustrates, in vertical section, a pressure vessel having a welded joint completed in accordance with the method of the invention;

Fig. 2 is an enlarged fragmentary section showing details of the welded joint here provided; while Figs. 3, 4 and 5 illustrate, in enlarged fragmentary section, details of the several steps followed in producing a joint by the method; and Fig. 6 is a fragmentary elevational view showing the manner of applying tack welds in accordance with the invention.

Referring now to the drawings and particularly to Fig. 1, a container A of a type adapted to hold liquefied gases is shown, and has a thin-walled inner vessel 10 disposed within a heavy walled outer vessel, fabricated from a plurality of parts here denoted 11 and 12 and having a welded joint 13 uniting them. The vessel 10 is spaced away from the inner wall of the outer vessel by a comparatively small interval for purposes of economy.

In fabricating a joint 13, in accordance with the invention, the parts 11 and 12 are brought together and held with their welding edges in proper spaced relation. This may be accomplished in any suitable manner, for example by means of a metal strip, as shown at 14, which is preferably arranged to straddle the joint; details of a joint made in this manner are shown in Fig. 2.

In Fig. 3 the joint is shown in an early stage of the process. The edges of the two parts 11 and 12 to be joined are first chamfered to the desired angle and shape, as indicated. They are then cleaned and coated with a fluxing material of a composition capable of effecting the welding of the particular metal of the outer vessel, and a layer of weld-metal laid-in, as pointed out more particularly hereinafter.

Where a strip of metal 14, hereafter referred to as a "backing strip", is to be employed, a band of suitable dimensions is provided made from metal of a composition having a melting point higher than the melting point of the metal to be joined and has a substantial heat conductivity, for example, of copper or steel. This backing strip is preferably deformed to provide a central channel 15 which is disposed at the edges of the parts 11 and 12. One edge of the backing strip is attached by a continuous or "fillet" weld 16 to the inner face of one of the parts, for example, the upper part 12. After attaching the backing strip 14 to such part, the other part is brought into proper relation to the first so that a desired space separates the extreme edges of the parts which are to be joined together. The degree of spacing will vary with conditions, for example when the metals to be joined are about three-quarters of an inch thick and the vessel in the neighborhood of four feet in diameter at the joint, a suitable spacing would be about three-eighths of an inch. When the parts have been adjusted to the desired relation, the adjustment is fixed by attaching the backing strip 14 to the lower part 11 by means of "tack welds" or discontinuous short welds 17 at the extreme edge of part 11, in the manner illustrated in Fig. 6. A sufficient number of such welds are disposed around the circumference to hold the parts securely without the aid of external means.

In Fig. 4 the condition of the joint using a backing strip is shown when the first welding stage is completed, i. e., after the first layer of weld-metal shown at 18 has been deposited. During this stage, the tack welds 17 are fused and become merged with newly deposited weld-metal which also fuses with the extreme edges of the parts 11 and 12. The intense heat of the autogenous flame and of the molten metal, it is seen, will be intercepted by the backing strip which conducts a large portion of it away from the place where the fusion occurs to the edges and transfers a further portion to the metal parts 11 and 12, thus preventing the flame from injuring the thin wall of the inner vessel 10. The backing strip also prevents the formation of dependent masses of weld-metal on the inside of the outer vessel by retaining the weld metal within the channel 15.

The present method of holding the parts of the pressure vessel in desired relation during the welding minimizes the effects of the contraction that occurs as the deposited metal cools, so that no shrinkage cracks will occur even when the metal is comparatively hot short, that is, when the metal lacks tensile strength at high temperatures.

When the first layer 18 of weld-metal has been deposited, the surfaces of the weld-metal and the chamfer are cleaned and coated with flux and a second layer 19 of weld-metal is deposited so that the faces of the chamfer and the previous layer of weld-metal are fused with the new layer. This stage of completion is illustrated at Fig. 5 by a fragmentary sectional view where the second layer deposit is shown at 19. After cleaning and coating with flux, a third layer of weld-metal is deposited to complete the joint which is shown in section at 13 in Fig. 2. The former surfaces of the previous layers of deposited metal are here indicated by dotted lines; however, visual or photographic observation of an actual section through the joint would disclose no definite line of demarkation in a properly welded joint.

It will be seen that the backing strip shields the thin-walled inner container 10 from the effect of the heat of the welding flame and hot gases and the radiation from the molten metal, and that the molten metal is supported and retained in the channel of the shield and prevented from forming protuberances on the inside of the pressure vessel.

The backing strip, when utilized in accordance with the invention, promotes the thorough fusion of the deposited metal with the metal parts to be joined throughout the whole joint, including the apex of the V. The use of the backing strip also provides a useful means of quickly aligning and fixing the parts to be joined in proper relation which greatly facilitates the production of the desired apparatus. The parts are held in alignment by the backing strip in such manner that the formation of cracks due to shrinkage of the parts on cooling is avoided.

The method of depositing the weld-metal in two or more layers as disclosed herein results in an increase in strength over the welds produced with the same metals by previous methods to a degree that was entirely unpredictable previous to the application of the new method. For example, many tensile test specimens cut from cupons of three-quarter inch thick copper alloys and tested for tensile properties in accordance with testing methods specified by the A. S. M. E. code for welded pressure vessels have been tested, and these specimens showed that they were not on the average merely slightly stronger than specimens from cupons welded by experienced operators using the single layer method of the present general practice, but proved to be, on the average, of much greater strength; the welded joint produced being of greater than 100% efficiency, that is, the strength of the joint was greater than the strength of the base metal. This was accomplished while the ductility of the weld metal in the joint, as shown by elongation and reduction of area during testing, retained a relatively high value. Standard bend tests of specimens bent in the weld also showed the weld metal deposited by the method of the invention to be ductile and to be entirely free from notch brittleness.

In an application of this multi-layer method of welding to sections of a copper silicon alloy in the form of one inch thick rolled plate, tests have shown that the increase in strength is thirty to forty percent above that attained by the best previous welding methods. In welding such alloy by the present method, it is advantageous to adjust the welding torch to furnish an oxidizing flame.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent, is:

1. The method of welding copper alloy metal bodies having relatively thick sections which comprises bringing together a plurality of said bodies so as to have their welding edges in spaced welding position, laying in a continuous layer of a copper alloy welding metal by means of an oxydizing gas flame in the space between said edges to a desired depth less than that of the completed joint, and when said first layer is completed laying in a second continuous layer by means of an oxydizing gas flame more completely filling said joint.

2. The method of welding copper alloy bodies having relatively thick sections which comprises bringing together a plurality of said bodies so as to have their welding edges in spaced welding position, maintaining said parts in alignment by a discontinuously attached backing whereby undesired displacement through shrinkage is avoided, joining the edges to be welded by more than one fushion welding operation in the same joint comprising, depositing a first layer of weld metal in fushion with the extreme edges of the parts to be joined, and depositing successive layers of weld metal over the first layer in fusion with said first layer and the parts joined to complete the joint; said deposition of weld metal being effected with the employment of a gas welding torch adjusted to produce a flame of oxidizing character.

3. The method of welding copper alloy bodies having relatively thick sections which comprises bringing together a plurality of said bodies so as to have their welding edges in spaced welding position, holding said parts substantially rigidly in a desired welding position by a backing discontinuously attached, laying in weld metal by means of a gas flame in the space between said edges to a desired depth less than that of the completed joint, permitting the first layer to cool, and laying in successive continuous layers to complete the joint by means of a gas flame having an oxidizing characteristic.

4. The method of welding copper alloy bodies having relatively thick sections which comprises bringing together a plurality of said bodies so as to have their welding edges in spaced welding position, securing said parts in desired welding position by means of a backing attached to said parts by welds at a plurality of points which provides a bottom to the space between said welding edges, and completing the weld by laying in said space successive continuous layers of weld metal to complete the joint by means of a gas flame.

5. The method of welding metal bodies of copper alloy having relatively thick sections formed with chamfered welding edges which comprises welding a relatively thin backing strip to one body about the welding edge, bringing the other body into a position over said backing strip to have its welding edge adjacent to but spaced from the welding edge of the first body, forming welds discontinuously in said space between said backing strip and said second body, and laying in a copper alloy weld-metal in said space in a plurality of layers until a homogeneous joint of desired depth is provided.

6. The method of welding copper alloy bodies having relatively thick sections which comprises securing a backing strip to one body adjacent the welding edge by means of a continuous fillet weld, positioning a second body with respect to the first body so that its welding edge is adjacent to but spaced from the welding edge of the first body over said backing strip, securing said second body in place upon said backing strip by means of discontinuous welds applied to said space, and thereafter laying in the weld-metal in said space by means of a gas flame having an oxidizing characteristic.

7. The method of welding copper alloy bodies having relatively thick sections formed with chamfered welding edges which comprises securing a relatively thin backing strip to one body adjacent the welding edge by means of a continuous fillet weld, positioning a second body with respect to the first body so that its welding edge is adjacent to but spaced from the welding edge of the first body over said backing strip, securing said second body in place upon said backing strip by means of discontinuous welds applied in said space, and thereafter completing its joint by means of a fusion welding operation.

8. The method of welding copper alloy bodies having relatively thick sections over a relatively thin metal vessel which comprises fillet welding a backing strip to one body about the welding edge, bringing a second body into welding position adjacent the first body so as to have the welding edges spaced apart over the backing strip, the backing strip being also positioned to separate said bodies from said thin metal vessel, tack-welding said second body to said backing strip at a plurality of points in the space separating said welding edges, and thereafter laying weld-metal in said space in a plurality of layers by means of a welding torch.

9. The method of welding bodies of a copper alloy having relatively thick sections about a vessel of relatively thin metal which comprises securing a deformed strip of metal by a fillet weld to one of said bodies adjacent the welding edge, positioning a second body so as to have its welding edge projecting over said backing strip adjacent to but spaced from the welding edge of the first body, said bodies being arranged to encompass said thin walled metal vessel but separated therefrom by means of said backing strip, securing said second body in place to said backing strip by means of tack welds applied to a plurality of points in the space between said welding edges, and thereafter laying in weld-metal in said space in a plurality of layers by means of a welding torch furnishing an oxidizing flame.

10. The method of constructing a pressure container which comprises forming parts to be welded together from relatively thick rolled sheets of copper alloy, welding a relatively thin deformed strip of metal to one of said parts against its inner surface about the edge to be welded, bringing a second part into desired relation with said first part so as to have the welding edges adjacent but spaced apart over said strip of metal, tack-welding said second part to said strip of metal while in the desired relation, and thereafter joining the edges to be welded by a plurality of fusion welding operations laying in a copper alloy weld metal in said space to form a homogeneous joint.

11. The method of constructing a pressure container which comprises forming parts from rolled sheets of copper alloy, welding to one of the parts against its inner surface near the edge to be welded a deformed strip of metal, bringing a second part into desired relation with said first part, fixing said relation by tack-welding said second part to said strip of metal, joining the edges to be welded by more than one fusion welding operation in the same joint comprising, depositing a first layer of weld-metal in fusion with the extreme edges of the parts to be joined and substantially filling the channel of said strip of metal, and depositing successive layers of weld metal over the first layer in fusion with said first layer and the parts joined to complete the joint; said deposition of weld-metal being effected with the employment of a gas welding torch adjusted to produce a flame of oxidizing character.

12. In a liquid containing vessel, the combination with relatively thick sections of a copper alloy having joints of a copper alloy laid in by fusion welding, of backing bands of relatively thin metal, whose melting point is higher than the melting point of the laid-in metal and having a longitudinal channel disposed back of said joints and against the interior surfaces of said sections whereby substantially unstrained joints are provided.

13. In a liquid containing vessel, the combination with a plurality of fabricated sections formed substantially of a copper-silicon alloy and having joints of a fused metal of a copper-silicon alloy laid in by fusion welding, of backing bands of relatively thin sheet metal having a melting point higher than that of said alloy and formed with longitudinal channels disposed against the interior surfaces of said sections immediately back of said joints in such relation that said channels are substantially immediately below the middle line of said joints.

MATTHEW J. WALL.